(12) United States Patent
Grebenkemper et al.

(10) Patent No.: US 6,366,972 B1
(45) Date of Patent: Apr. 2, 2002

(54) MULTI-USER COMMUNICATION BUS WITH A RESISTIVE STAR CONFIGURATION TERMINATION

(75) Inventors: C. John Grebenkemper, Saratoga; Dong Nguyen, San Jose, both of CA (US)

(73) Assignee: Compaq Computer Corporation, Houston, TX (US)

( * ) Notice: Subject to any disclaimer, the term of this patent is extended or adjusted under 35 U.S.C. 154(b) by 669 days.

(21) Appl. No.: 08/685,256

(22) Filed: Jul. 23, 1996

(51) Int. Cl.[7] ............................................. G06F 13/00
(52) U.S. Cl. ...................................................... 710/106
(58) Field of Search ........................ 395/200.5, 200.82, 395/306; 326/30, 86

(56) References Cited

U.S. PATENT DOCUMENTS

| | | | | |
|---|---|---|---|---|
| 4,280,221 A | * | 7/1981 | Chun et al. ................ 375/17 |
| 4,736,124 A | * | 4/1988 | McFarland, Jr. ............ 307/471 |
| 4,763,087 A | * | 8/1988 | Schrader ..................... 333/101 |
| 4,912,724 A | * | 3/1990 | Wilson .......................... 375/7 |
| 5,216,667 A | * | 6/1993 | Chu et al. ...................... 370/24 |
| 5,347,177 A | * | 9/1994 | Lipp ........................... 307/443 |
| 5,359,235 A | * | 10/1994 | Coyle et al. ............. 307/296.1 |
| 5,448,591 A | * | 9/1995 | Goodrich ..................... 375/257 |
| 5,463,359 A | * | 10/1995 | Heaton ......................... 333/32 |
| 5,548,734 A | * | 8/1996 | Kolinski et al. ............ 395/306 |
| 5,638,402 A | * | 6/1997 | Osaka et al. ................ 375/257 |

* cited by examiner

Primary Examiner—David Wiley
(74) Attorney, Agent, or Firm—Leah Sherry Oppenheimer, Wolff & Donnelly

(57) ABSTRACT

A multi-user bus is divided into a number of bus portions, one for each user. Each bus portion is coupled, at one end, to one of the multiple users and through an impedance matching network to the other bus portions in a star configuration. The disclosed embodiment teaches various resistive impedance matching networks.

29 Claims, 3 Drawing Sheets

MULTI-USER COMMUNICATION BUS WITH A RESISTIVE STAR CONFIGURATION TERMINATION

BACKGROUND OF THE INVENTION

The present invention relates generally to data processing systems, and particularly to a configuration for a high-speed, multi-user bus structure to attenuate noise attributable to ringing and signal reflections on the bus.

As clock speeds used in computing and data processing systems increase (e.g., in the 100 Mhz range or higher), it is becoming important to give attention to the electrical characteristics of the medium used to communicate information between two or more elements of the system. Higher computing and communicating speeds have shrunk pulse widths, making it important that the integrity (i.e., sharpness of) pulse transitions, the rise and fall times of those pulses, and the higher frequencies forming those transitions be maintained.

Corruption of the integrity of a pulse can be attributed to a number of factors that are primarily found in the particular environment, among them impedance discontinuities in the signal path which can lead to pulse distortion itself, as well as serving as the source of ringing, and reflections which can further attack pulse integrity. (Ringing is that distortion following a major transition, and is usually in the form of a superimposed, clamped oscillatory waveform. Reflection is that phenomenon that occurs when a pulse encounters a discontinuity or different transmission medium, producing a reflected version of the pulse on the original transmission medium.) Matching the different impedances encountered in the signal path between the source and destination of the pulse (including the source output and destination input impedances) is one tried and true method of improving signal quality. But, in a real world environment it is very difficult, if not at times impossible, to match impedances sufficiently. Discontinuities imposed by connectors, inexact input or output impedances, and other factors can and do operate to sully data signals (i.e., pulse construction). As a result, the pulse may take longer to achieve a recognizable voltage level.

The mechanical construction and packaging of data processing and computing systems often use multiple printed-wiring circuit boards (PWBs) that communicatively connect to one another by a bus structure of form or another. One popular packaging construction provides removable connection of the PWBs to a backplane, or like assembly that carries the bus structure. Preferably, the signal paths between the bus structure and whatever driver/receiver circuit devices are employed by the users of the bus structure, the PWBs, should be kept short for improved electrical characteristics of high-speed signals. Signal paths that are too long can lead to ringing, resulting in excessive pulse settling times. Unfortunately, in some cases it may not be physically possible to use an electrically short signal path between the driver/receiver of a PWB and the bus structure due to routing restraints on the PWB, or perhaps because of the particular wiring of the bus in the backplane for connecting multiple PWBs.

One solution often used to reduce ringing and reflections is to place a series terminating resistance in the signal path proximate the driver/receiver element of the PWB. (Shared bus structures typically employ a tri-state device that operates in one of two mutually-exclusive modes: to drive signals onto, or to receive signals from, the bus structure. For that reason they are referred to herein as "driver/receivers.") This solution is illustrated in FIG. 1, which shows one bit line of an N-bit communication bus 14 with four users. The bus 14 is divided into bus portions 14' to illustrate the equivalent transmission line segments of the bus that extend between PWB connectors 13. The signal lines from the connectors to the driver/receiver devices 12 on the PWB are shown as segments or transmission line equivalents 15. FIG. 1 shows resistors R placed serially in the signal path, preferably near or at the output/input of the driver/receiver devices 12. This configuration is applicable to active devices having driver portion output impedances less than the characteristic impedance of the bus and PWB and a receiver portion input impedance much greater than the PWB characteristic impedance. Systems using CMOS devices and some TTL designs, for example, often use this solution. For devices having a low input impedance, such as emitter-coupled logic (ECL), parallel terminations are used to help reduce ringing and reflections. (i.e., the series resistors R in FIG. 1 are removed, and the outer ends left and right in FIG. 1 are tied to AC ground through appropriate resistances.) Whichever solution is used, routing requirements may cause the various paths forming the bus portions 14' or the PWB paths 15 to be on the order of several inches in length, creating path impedances that are difficult to match by the resistances R. In such cases, any meaningful reduction of the ringing and excessive settling on the bus by such techniques is lost. But even with proper impedance matching, ringing and settling can still occur in amounts that unduly affect performance.

SUMMARY OF THE INVENTION

The present invention provides a bus structure and configuration that operates to significantly reduce ringing and settling times of signalling used for high-speed data communication in a digital processing or computing system.

According to the present invention, the bus structure is divided into a number of bus portions, one bus portion for each user of the bus structure. The bus portions are connected together through an impedance matching network to form a star topology. The particular configuration of the impedance matching network depends upon the number of users connected to and using the bus structure. In the preferred embodiment of the invention the impedance of the network is primarily resistive. The values of the resistors used are a function of the design impedance of the connecting paths, i.e., the characteristic impedance of the signal paths between the driver/receiver device and the bus structure, and that of the signal paths forming the bus, and the input/output impedances of the active devices, the receivers/drivers, that drive and receive from the bus structure.

The invention has the advantage of achieving the reduction of ringing, signal reflections, and excessive settling time by meaningful amounts over that of prior systems.

These and other advantages and features of the present invention will become apparent to those skilled in this art upon a reading of the following description of the invention which should be taken in conjunction with the accompanying drawings.

DESCRIPTION OF THE PREFERRED EMBODIMENT

Figure 2A:
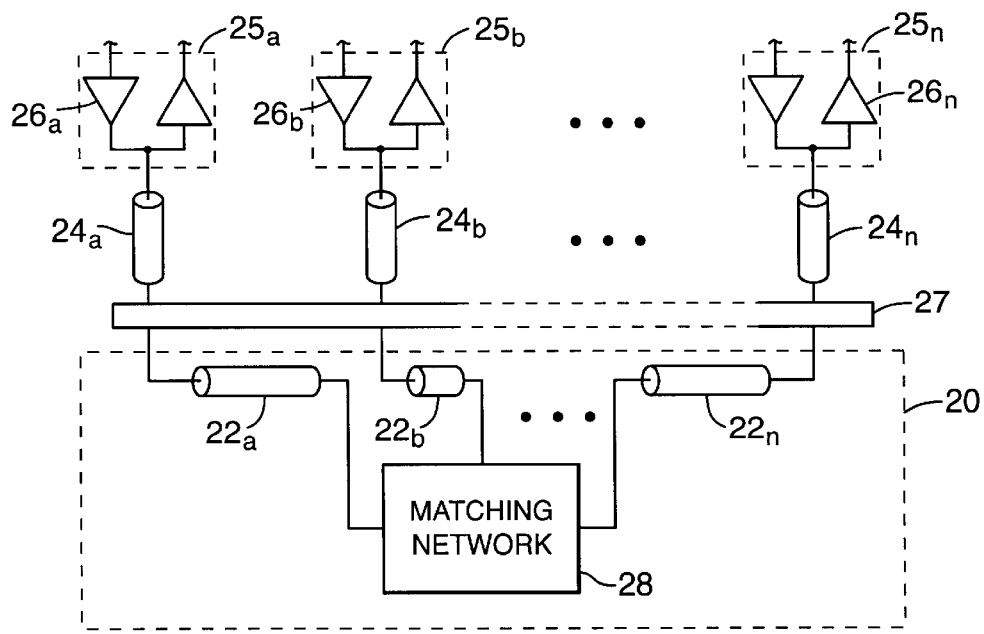
FIG. 2A illustrates a general form of the invention connecting multiple user units to one another by a shared bus that includes an impedance matching network at the center of a star configuration.

Turning now to the figures, FIG. 2A illustrates, in general form, the bus configuration of the present invention. FIG. 2 is meant to show what would be one of a number of signal paths that would make up a communication connection between multiple users. It will be understood that FIG. 2 (and the connections shown and discussed hereinafter) may be replicated a number of times for an entire bus or communication connection.

Figure 2B:
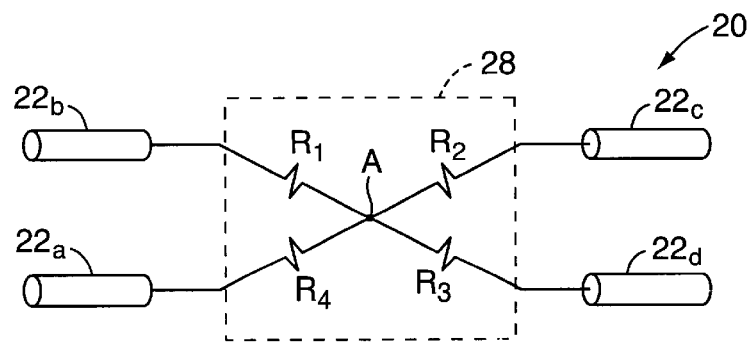
FIG. 2B illustrates an embodiment of the invention of FIG. 2A for communicating four user units to one another through a resistive impedance matching network.

As FIG. 2 shows a bus structure 20 provides data communication between N user units 25 ($25_a$, $25_b$, ..., $25_n$) each having an active driver/receiver device 26 ($26a$, $26b$, ..., $26n$) to drive signals onto, or receive signals from, the bus structure 20. Signal paths 24 ($24_a$, $24_b$, ..., $24_d$) couple the driver/receiver devices 25 to the bus structure 20 through a connector 27. (This discussion assumes that the user units 25 are circuit boards that removably connect to the bus structure 20—itself in the form of or carried by a backplane or like structure. However, those skilled in this art will appreciate that other structures and configurations of the user units 20 and such connections will benefit from the present invention.) As FIG. 2B further shows, the bus 20 is formed with N bus segments 22 ($22_a$, $22_b$, ..., $22_n$), each respectively connecting a corresponding user unit 25 (and associated signal path 24) in star configuration to a impedance matching network 28.

The signal paths 24 represent a printed circuit path formed on a PWB, i.e., the user units 25, and are shown separately from the bus segments 22 to illustrate the connector 27. Those skilled in this art will recognize that the signal paths 24 could just as well be lumped with their corresponding bus segments 22, and shown as four unitary paths to the impedance matching network 28 rather than as shown in FIG. 2B: N paths, each with two separate portions.

Ideally, the number of user units 25 capable of employing the invention can be any number; realistically, however, the best results are achieved if the number is limited to two to six units 25. Thus, shown is FIG. 2B is a construction of the impedance matching network 28 for a four user system. Each bus segment 22 connects to a central node A through a corresponding resistor R ($R_1$, $R_2$, ..., $R_4$). The values of the resistors R should lie in the range between 0 and $Z_0/2$, where $Z_0$ is the characteristic impedance of the circuit board(s) carrying the bus segments and signal paths 22, 24. In addition, the driver/receiver devices 26 will preferably have output and input impedances less than and greater than, respectively, the characteristic impedance. Thus, the present invention is particularly suited for use by systems in which the driver/receiver devices 26 employ CMOS technology. Where the characteristic impedance of the signal paths 24 and bus segments 22 are substantially equal, the values of the resistances R will be equal to each other.

Figure 3A:
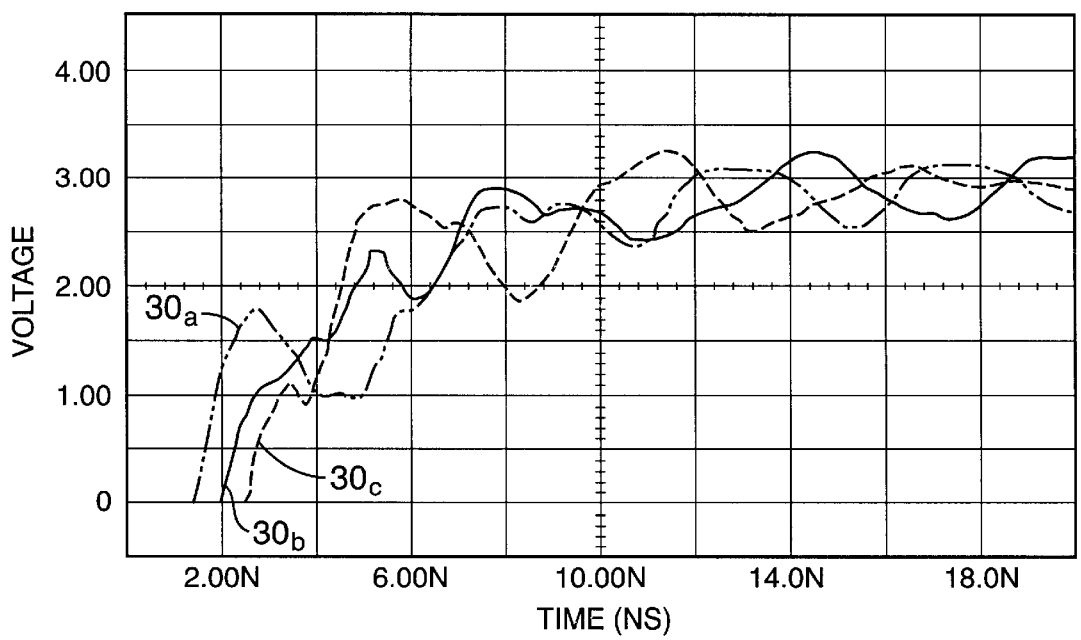
FIGS. 3A and 3B respectively illustrate comparative simulated waveforms for the prior art bus configuration of FIG. 1 and that of the configuration of the present invention illustrated in FIG. 2B.
Figure 3B:
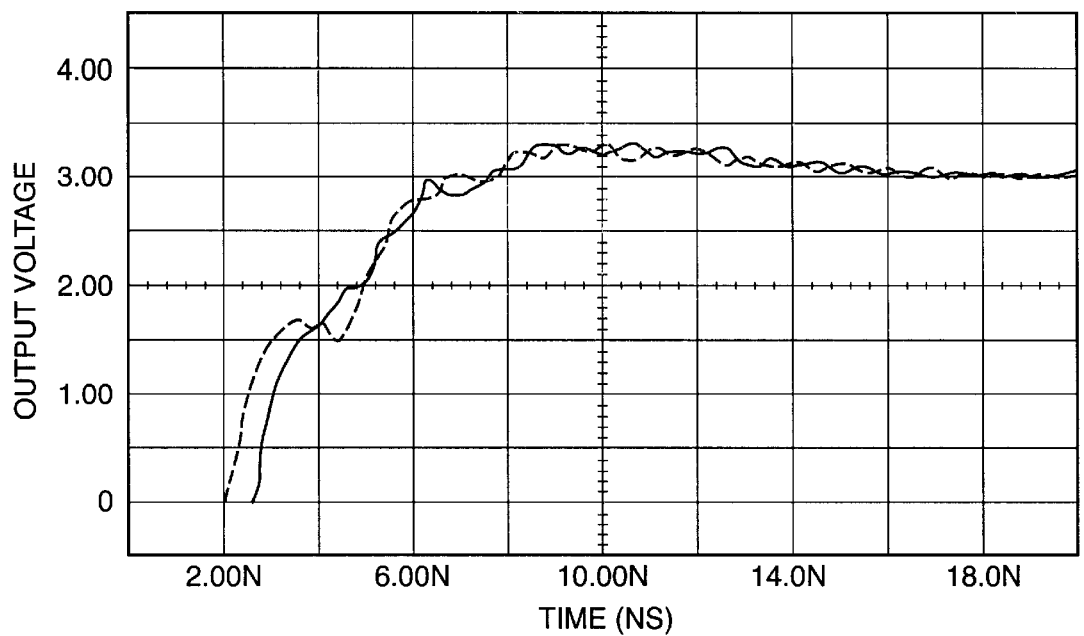

In an ideal case, the transmission line impedances of the bus segments and signal paths 22, 24 are assumed to all be equal to $Z_0$ and are considered lossless. Assume further that the driver portions of the devices 26 have zero output impedance, the receiver portions have an infinite input impedance, and any user unit 26 can drive the bus. For an ideal case such as this, each of the resistors R ($R_1$, $R_2$, ..., $R_4$) will preferably be equal to $Z_0/2$. Using the assumptions of such an ideal case, the waveform integrity of the prior art configuration (FIG. 1) can be compared to that of the invention as illustrated in FIG. 2, using the well-known SPICE circuit modeling program. For the comparison, it is assumed that the characteristic impedance of the signal paths is approximately 50 ohms in each case (prior art—FIG. 1 and invention—FIG. 2B). The driver output is assumed to be 3 volts, and a valid high signal is 2 volts. FIGS. 3A and 3B show the waveform simulations produced at selected receivers of the SPICE program, using the aforementioned criteria and assumptions.

Figure 1:
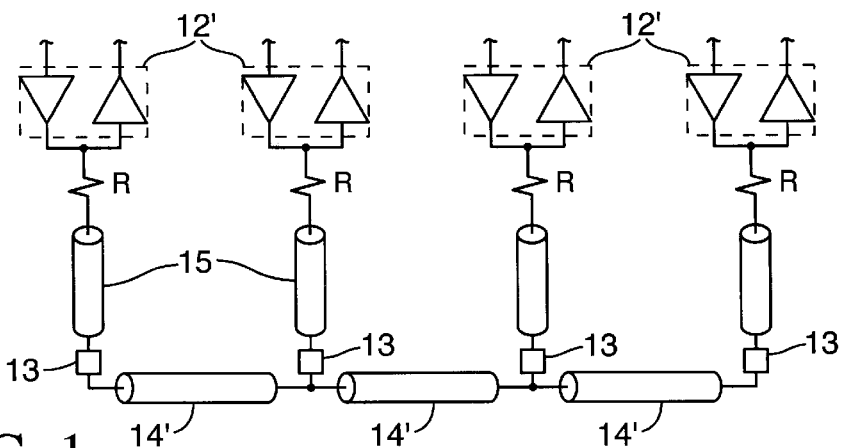
FIG. 1 illustrates a prior art method of reducing ringing and settling time on a bus structure.

First, FIG. 3A shows waveform simulations 30 at the inputs of the receivers of three of the user units 12 of FIG. 1. The signal is produced by the fourth user unit 12. As can be seen, the waveforms 30 exhibit a great deal of ringing still on the bus 14 even after 20 ns. The signal doesn't begin to settle to a valid high until nearly 9 ns after the waveform has switched.

In contrast, FIG. 3B shows the SPICE simulated waveforms at the inputs of two user units 25 of FIG. 2B. Since the characteristic impedance used for the SPICE simulation for FIG. 3B was the same as that used for FIG. 3A, 50 ohms, each of the resistors R1, R2, ..., R4 were given the value of 25 ohms to achieve optimum signal integrity. Note that, as FIG. 3B illustrates, the signals settle close to a valid high in just a little more than 5 ns, and there is substantially no ringing after 10 ns. Thus, there will be no noise on the next cycle of the waveform and, therefore, no timing uncertainty due to noise generated by ringing and reflection.

As noted, the SPICE simulations of FIGS. 3A and 3B are for an ideal situation. In the star connected bus configuration of the invention (FIG. 2), the ideal case cannot achieve both an optimum 6 db attenuation and impedance matching of all inputs. Accordingly, the values of the resistors R1, ..., R2, ..., R4 can best be found by basing them upon SPICE simulations in which close approximations of the actual input and output impedances of the active devices 26 will need to be used to achieve optimum waveform quality and timing under actual conditions.

Figure 4:
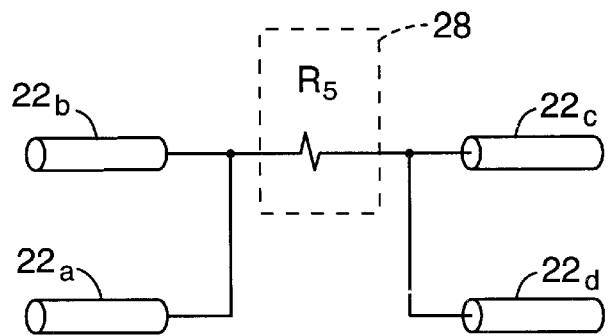
FIG. 4 illustrates an alternate embodiment of the invention of the resistive connection shown in FIG. 2B.

In the four user case of FIG. 2B, the impedance matching network can be replaced with a single resistance to save resistor count and still achieve a useful reduction of noise (e.g., ringing, reflections, etc.) Thus, as FIG. 4 shows, the impedance matching network 28 of four resistors $R_1$, $R_2$, ..., $R_4$ shown in FIG. 2B is modified by replacing the four with a single resistance, R5, to form the impedance matching network 28. Again, the value of the resistor $R_5$ will depend upon the impedance parameters of the circuit in which it is used, i.e., the characteristic impedances of the paths 23, and the input and output impedances of the active devices that are connected to drive, and receive from, those paths. For example, for a characteristic impedance of approximately 65 ohms, and assuming CMOS drivers and receivers, a resistance value of approximately 22 ohms will achieve acceptable quality waveform and timing, superior to that of prior configurations (e.g., FIG. 1), although not quite the quality waveform as the impedance matching configuration of FIG. 2B. The main advantage of the single resistor impedance matching network is the 75% reduction in resistor count.

The invention may be used to form bus connections that communicate a larger or smaller number of user units to one another. For example, FIG. 5 shows the present invention employed in a two user, point-to-point connection. Here, the impedance matching network 28 uses three resistors $R_6$, $R_7$, and $R_8$. Resistor $R_7$ connects the signal paths and bus segments (cumulatively shown here as paths 34) to one another while the $R_6$ and $R_8$ connect to a ground (G) potential. Resistor $R_6$, $R_7$ and $R_8$ form a standard "pi" configuration 6 db attenuator. Again assuming ideal conditions, the resistor values for resistors $R_6$ and $R_8$ are preferably approximately $3Z_0$ while $R_7$ is approximately $3Z_0/4$, where $Z_0$ is the characteristic impedance of paths 34. SPICE simulations can be used to determine optimum resistance values for less than ideal situations.

Figure 5A:
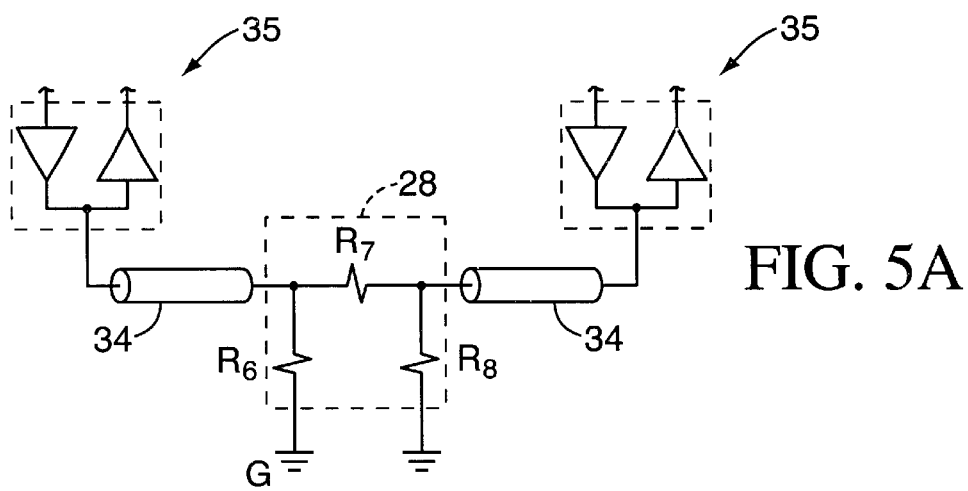
FIGS. 5A and 5B illustrate alternative approaches to a two-user (point-to-point) connection using the present invention.
Figure 5B:
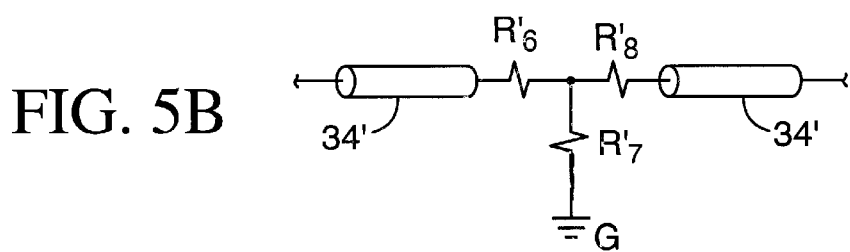
Figure 6:
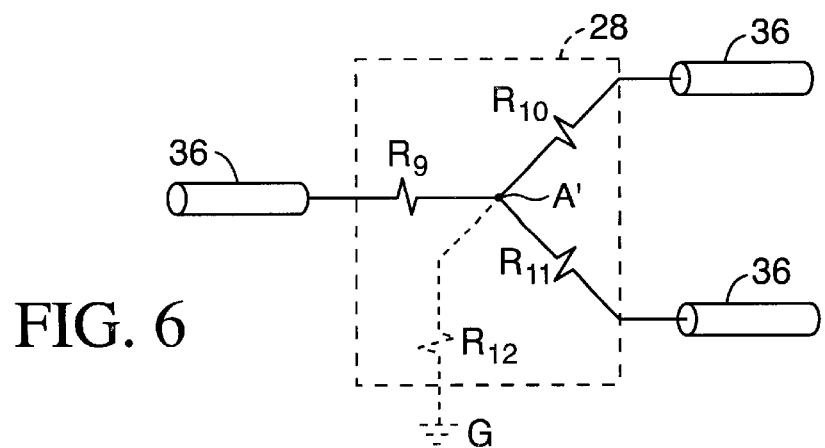
FIG. 6 shows the connection used for three user units.
Figure 3A:
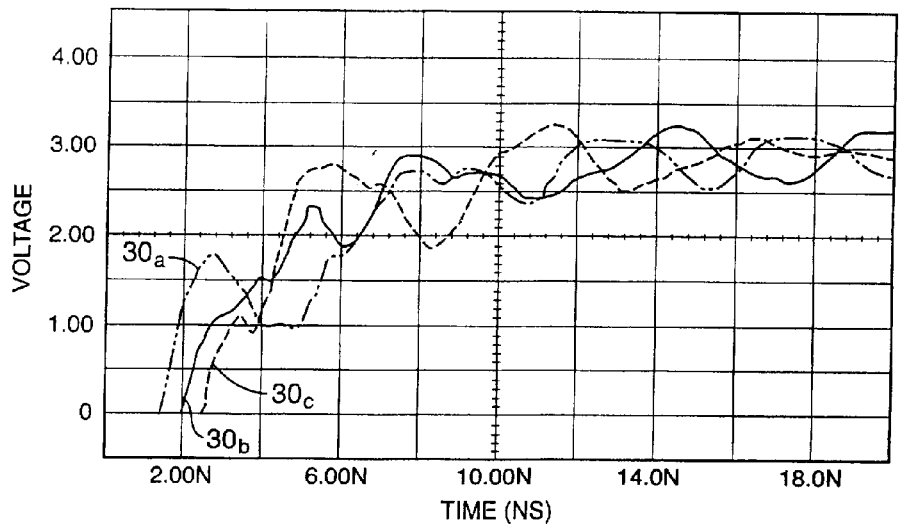
Figure 3B:
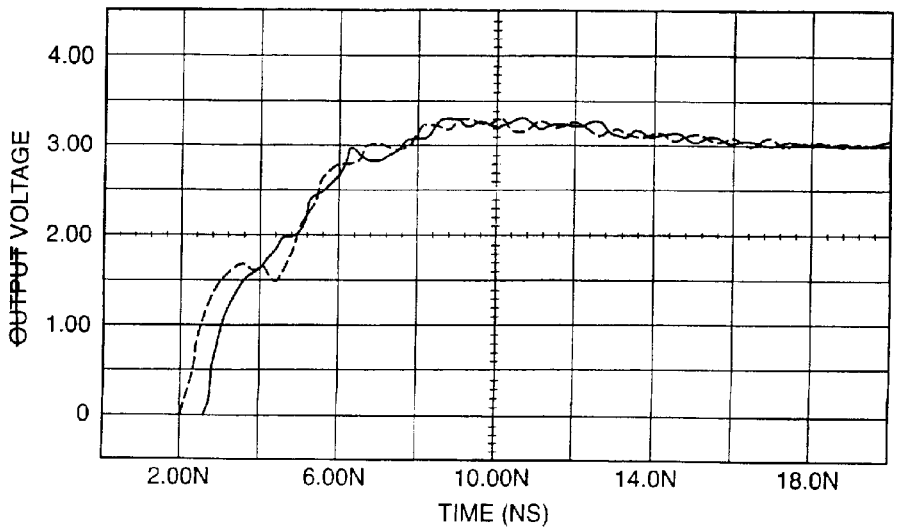

The pi configuration of FIG. 5 can be replaced with an equivalent standard T configuration, shown in FIG. 6 using resistors $R_6'$, $R_7'$, and $R_8'$, with the resistor $R_7'$ coupled to the ground potential G. For this configuration, under ideal conditions, the resistors $R_6'$, $R_8'$ each preferably have a value of $Z_0/3$ ohms, while the resistor $R_7$ will be $4Z_0/3$ ohms (again, $Z_0$ is the characteristic impedance of the transmission paths 34').

FIG. 6 illustrates a three user connection. As with FIGS. 4 and 5, the signal paths 36 cumulatively represent both the signal paths that may be formed on a PWB (not shown) from a driver/receiver (not shown in FIG. 6), and the associated bus segments. As FIG. 6 shows, the impedance matching network 28 for the three user configuration uses three resistors $R_9$, $R_{10}$, and $R_{11}$ to connect corresponding signal paths 36 in a star configuration to node A'. Ideal conditions dictate resistance values for the resistors $R_9$, $R_{10}$, and $R_{11}$ to be $Z_0/3$ each where, as above, $Z_0$ is the characteristic impedance of paths 36.

For impedance balancing it may, at times, be desirable to add a resistance $R_{12}$ (illustrated in FIG. 6 in phantom) to couple the node A to a ground potential (G). The resistive value of the resistor $R_{12}$ may vary up to infinity, and can be determined by SPICE simulations.

In similar fashion, the four user star configuration shown in FIG. 2 may also benefit from the addition of a fifth resistance, like the resistor $R_{12}$ in FIG. 6, to couple node A to a ground potential.

The ideal situations discussed above are, it will be appreciated, starting points for selecting resistance values in whatever configuration is selected for a bus connection, i.e., depending upon the number of users of that bus. Although the characteristic impedances of the various signal paths were considered to be substantially equal, they need not be equal. (In fact, there may be situations in which is desirable to have signal paths with unequal characteristic impedances.) Although, characteristic impedances for printed circuit configurations (as found in printed circuit boards, printed circuit backplanes, and the like) typically vary between 50–100 ohms. Resistor values, depending upon the configuration, and the parameters of the circuit (characteristic impedances, input/output impedances) will require use of SPICE simulations to obtain optimal or near-optimal values. However, using the present invention renders the lengths of the signal lines—(i.e., bus segments, paths on a PWB, etc.) less important. Thus, it can now be seen that the present invention relaxes the limitations heretofore placed upon location of the driver/receiver elements at each use unit.

Although a complete disclosure of the invention has been made, it will be evident to those skilled in this art that various modifications and changes can be made. For example, the impedance matching network 28 of the present invention has been discussed in terms of being primarily resistive, inductive or capacitive impedance matching can also be used, perhaps to greater effect under certain circumstances.

What is claimed is:

1. A bus construction for high speed digital communication between N user units, the bus construction including:
   N bus segments each having two end connections, one end connection of each of the N bus segments coupled to a corresponding one of the N user units; and
   an impedance matching network connected to the other of the two end connections of each of the N bus segments.

2. The bus construction of claim 1 wherein N is 4.

3. The bus construction of claim 2, wherein the impedance matching network includes for each bus segment a resistor connecting the other of the two end connections to a common node.

4. The bus construction of claim 1, wherein N is 3.

5. The bus construction of claim 1, wherein, for each bus segment, a resistance couples the bus segment to a common node.

6. The bus construction of claim 5, wherein each resistance is substantially equal to the resistance value of each of the other resistances.

7. A signal path for high speed communication between at least two digital units, the signal path comprising:
   an impedance matching network; and
   a path segment for each of the digital units coupling the corresponding digital unit to the impedance matching network.

8. The signal path of claim 7, the impedance matching network including, for each path segment, a resistor connecting the path segment to a common node.

9. A method of forming a bus for communicating a plurality of digital units to one another, the method including the step of:
   forming, for each digital unit, a signal path that includes a bus segment having a first end coupled to such digital unit and a second end connected to a resistance, the resistance of each such digital unit being connected to a common node.

10. The method of claim 9, wherein the number of the plurality of digital units is four, and including the step of providing each of the resistances with substantially the same value.

11. A bus for communicating a plurality of digital units to one another, the bus comprising:
   for each digital unit, a series connection to a node, the series connection including a bus segment coupled to the digital unit and a resistor connected to the node.

12. The bus of claim 11, wherein each of the bus segments has a characteristic impedance value of approximately Z0.

13. The bus of claim 12, wherein each of the resistors has a value substantially equal to the value of the other resistors and in the range of 0 and Z0/2.

14. The bus of claim 13, wherein the number of digital units is four.

15. The bus construction of claim 13, wherein the number of digital units is three.

16. A multiple bit-line bus construction for high speed digital communication between N user units, the bus construction including for each bit-line:
   an impedance network; and
   N bus segments each coupling a corresponding one of the N units to the impedance network.

17. The multiple bit-line bus connection of claim 16, wherein the impedance matching network includes a resistance coupled to a predetermined voltage potential.

18. The multiple bit-line bus construction of claim 17, wherein the voltage potential is a ground potential.

19. The multiple bit-line bus construction of claim 16, wherein the impedance network includes for each of the N bit segments, a first resistance coupling such bus segment to a common node.

20. The multiple bit-line bus construction of claim 19, including a second resistance coupling the common node to a voltage potential.

21. The multiple bit-line bus construction of claim 19, including a second resistance coupling the common node to a ground potential.

22. The multiple bit-line construction of claim 16, wherein N is 2.

23. The multiple bit-line construction of claim 22, wherein the impedance network is a 6 db attenuator.

24. The multiple bit-line construction of claim 23, wherein the 6 db attenuator is a resistor network in a pi configuration.

25. The multiple bit-line construction of claim 23, wherein the 6 db attenuator is a resistor network in a T configuration.

26. A bus system for communicating a plurality of bus signals between three transmitting/receiving devices of a computing system, the bus system comprising:

a bus segment for each of the three transmitting/receiving devices, each bus segment having a characteristic impedance of approximately $Z_0$, a first end coupled to such transmitting/receiving device and a second end connected to a node through a first resistance of a value of $Z_0/3$.

27. The bus system of claim 26, including a second resistance coupled between the node and a ground potential.

28. A bus system for communicating a plurality of bus signals between a four transmitting/receiving devices of a computing system, the bus system comprising:

a bus segment for each of the four transmitting/receiving devices, each bus segment having a characteristic impedance of approximately $Z_0$, a first end coupled to such transmitting/receiving device, and a second end connected to a node through a first resistance of a value of approximately $Z_0/2$.

29. The bus system of claim 28, including a second resistance coupled between the node and a ground potential.

\* \* \* \* \*

UNITED STATES PATENT AND TRADEMARK OFFICE
CERTIFICATE OF CORRECTION

PATENT NO.    : 6,366,972 B1
DATED         : April 2, 2002
INVENTOR(S)   : C. John Grebenkemper et al.

It is certified that error appears in the above-identified patent and that said Letters Patent is hereby corrected as shown below:

Drawings,
Fig. 3B at Sheet 2 is called the waveform graph of "Output Voltage" over "Time" it should be called the -- waveform graph of "Voltage" over "time --.

Column 1,
Line 46, reads: "to one another by a bus structure of form or another. One" it should read: -- to one another by a bus structure of one form or another. One --.

Column 3,
Line 18, reads: "form, the bus configuration of the present invention. FIG. 2" it should read: -- form, the bus configuration of the present invention, FIG. 2A --;
Line 21, reads: "between multiple users. It will be understood that FIG. 2" it should read: -- between multiple users. It will be understood that FIG. 2A --;
Line 25, reads: "As FIG. 2 shows a bus structure 20 provides data com" it should read: -- As FIG. 2A shows, a bus structure 20 provides data com --.
Line 29, reads: "structure 20. Signal paths 24 ($24_a$ $24_b$...., $24_d$) couple the" it should read: -- structure 20. Signal paths 24 ($24_a$ $24_b$...., $24_n$) couple the --
Line 35, reads: "20 and such connections will benefit from the present"; it should read: -- 25 and such connections will benefit from the present --;
Line 39, reads: "associated signal path 24) in star configuration to a imped-" it should read: -- associated signal path 24) in star configuration to an imped- --.
Line 53, reads: six units 25. Thus, shown is FIG. 2B is a construction of the"; it should read: -- six units 25. Thus, shown in FIG. 2B is a construction of the --.

Column 4,
Line 11, reads: "invention as illustrated in FIG. 2 using the well-known" it should read: -- invention as illustrated in FIG. 2B using the well-known --;
Line 39, reads: "of the invention (FIG, 2 ), the ideal case cannot achieve both" it should read: -- of the invention (FIG. 2B), the ideal case cannot achieve both --.

Column 5,
Line 3, reads: "another. For example, FIG. 5 shows the present invention"" it should read: -- another. For example, FIG. 5A shows the present invention --;

UNITED STATES PATENT AND TRADEMARK OFFICE
CERTIFICATE OF CORRECTION

PATENT NO. : 6,366,972 B1
DATED : April 2, 2002
INVENTOR(S) : C. John Grebenkemper et al.

It is certified that error appears in the above-identified patent and that said Letters Patent is hereby corrected as shown below:

Column 5 cont'd.
Line 16, reads: "The pi configuration of FIG. 5 can be replaced with an" it should read: -- The pi configuration of FIG. 5B can be replaced with an --;
Line 17, reads: "equivalent standard T configuration, shown in FIG. 6 using" it should read: -- equivalent standard T configuration, shown in FIG. 5B using --;
Line 30, reads: "resistors $R_g$, $R_{10}$, and $R_{11}$ to connect coresponding signal" it should read: -- resistors $R_9$, $R_{10}$, and $R_{11}$ to connect coresponding signal --
Line 41, reads: "in FIG. 2 may also benefit from the addition of a fifth" it should read: -- in FIG. 2B may also benefit from the addition of a fifth --;
Line 51, reads: "equal. (In fact, there may be situations in which is desirable" it should read: -- equal. (In fact, there may be situations in which it is desirable --;

Column 6,
Line 4, reads: "resistive, inductive or capacitive impedance matching can" it should read: -- resistive, however inductive or capacitive impedance matching can --.

Column 8,
Line 14, reads: "signals between a four transmitting/receiving devices of a" it should read: -- signals between four transmitting/receiving devices of a --.

Signed and Sealed this

Twentieth Day of August, 2002

*Attest:*

JAMES E. ROGAN
*Director of the United States Patent and Trademark Office*

*Attesting Officer*